March 27, 1951
L. P. EVANS
2,546,634
METHOD AND APPARATUS FOR CONTACTING GASES
WITH PARTICLE FORM SOLID MATERIAL
Filed June 9, 1944
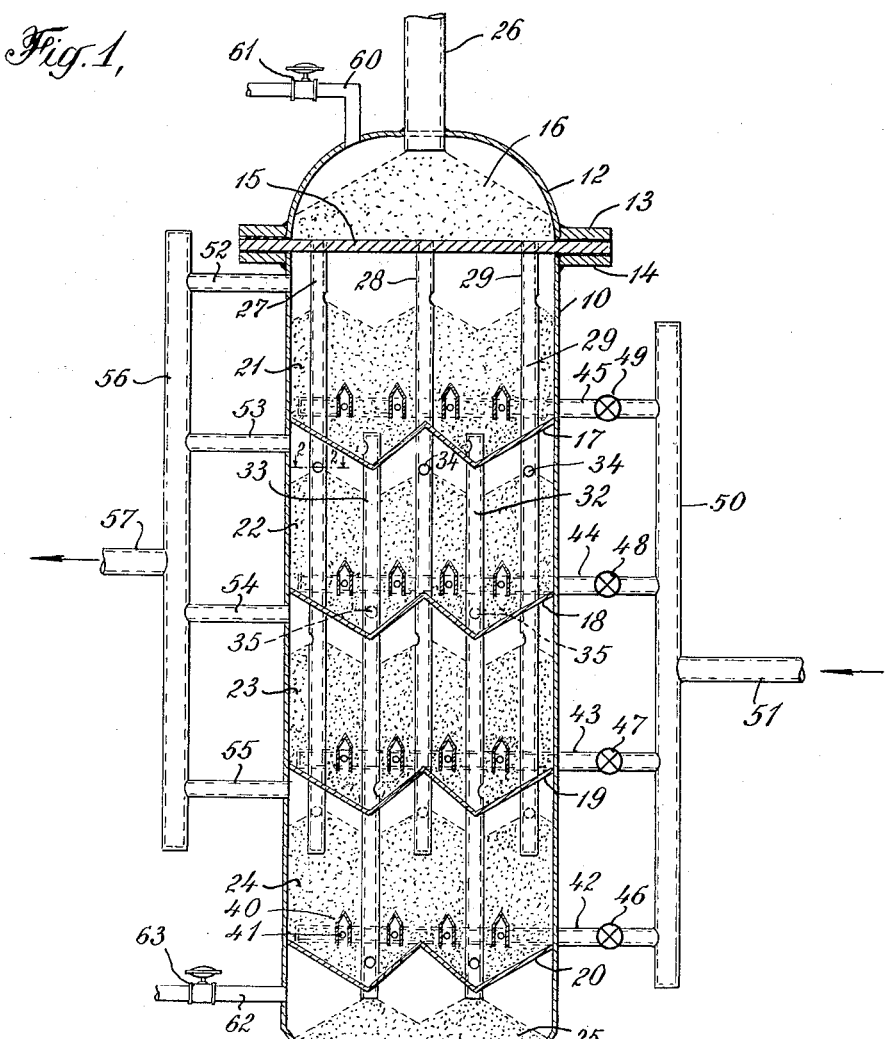
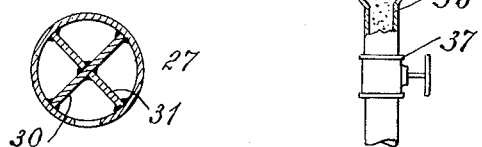
Louis P. Evans
INVENTOR
BY
ATTORNEY Patented Mar. 27, 1951

2,546,634

UNITED STATES PATENT OFFICE 2,546,634

METHOD AND APPARATUS FOR CONTACTING GASES WITH PARTICLE FORM SOLID MATERIAL

Louis P. Evans, Woodbury, N. J., assignor to Socony-Vacuum Oil Company, Incorporated, a corporation of New York Application June 9, 1944, Serial No. 539,556

12 Claims. (Cl. 23—1)

This invention relates to processes wherein gases are contacted with particle form solid material for any of a number of purposes such as, solid material treatment, gas adsorption, gas separation, gas treatment or catalytic gaseous conversion. The invention is especially directed toward gaseous conversion processes such as the catalytic reforming, isomerization, polymerization, cracking, hydrogenation, dehydrogenation and desulfurization of hydrocarbons. Typical of such processes is the catalytic cracking conversion of hydrocarbons, it being well known that gas oils boiling in the range of 500 to 750° F. may be converted to gasoline, gas and other products when passed over a particle form solid adsorbent material at controlled conditions of temperature such as, for example, 800° F. and higher, and pressures, usually above atmospheric. The particle form solid contact mass material may partake of the nature of natural or treated clays, such as fuller's earth, Super Filtrol or bauxite or of various synthetic associations of alumina, silica or alumina and silica, any of which may or may not have other constituents added such as certain metallic oxides. In a most recent form, this operation has been developed as one in which the particle form solid contact mass material is moved cyclically through two zones in the first of which it is subjected to gaseous reaction and in the second of which it is subjected to the action of a fluid regeneration medium, such as air, acting to burn off contaminant materials deposited upon the contact mass during the gaseous reaction.

This invention has specifically to do with a method of operation and the construction of a reactor wherein gaseous reactants are brought in contact with a moving stream of particle form contact mass material. In one form of reactor heretofore used, the solid material is passed through an elongated reaction vessel as a substantially compact continuous column of downwardly moving particle form solid material. Gaseous reactants are passed through the length of said column either concurrently or countercurrently to the direction of solid material flow. A second type of reactor which will permit substantially greater reactant gas throughput rates without disruption of the solid material flow involves passing the solid material downwardly through a series of superimposed short reaction stages and passing the gas in parallel through the several reaction stages. Since in many operations the catalytic activity of the solid material gradually decreases as it passes through the several superimposed reaction stages, due to contaminant deposition thereon, the yield and property of gaseous conversion products formed in the several parallel stages is not uniform. Thus the properties of the gasoline formed in the last of a series of such parallel stages in a hydrocarbon cracking operation may be markedly inferior to that of the gasoline product from the first of said series of stages. Such a result constitutes a decided disadvantage to such an operation.

A major object of this invention is the provision, in a process wherein gaseous reactants are contacted with a moving particle form solid material for the purpose of conversion, of a method of operation and apparatus wherein advantage may be taken of the relatively high permissible gas throughput rates obtainable by passage of reactant gases in parallel through a number of superposed reaction stages, while at the same time maintaining uniformity of yields and properties of the gaseous conversion products from all of said stages.

Another object of this invention is the provision of an apparatus for contacting gas with a moving stream of particle form solid material, wherien substantial uniformity of the solid material contacting efficiency is maintained in the various levels of the contacting apparatus.

These and other objects, as will be pointed out hereinafter, have been obtained by the development of a method of operation and an apparatus which may be more readily understood by reference to the drawings attached to this specification, in which drawings Figure 1 is an elevational view, partially in section of a preferred form of the apparatus and Figure 2 is a sectional view of an important part of this apparatus. Both of these drawings are highly diagrammatic in character.

Turning now to Figure 1, we find a vertical elongated shell 10 closed on its lower end by a tapered drain section 11 and on its upper end by the rounded head section 12 which is connected to the shell by flanges 13 and 14. The shell 10 may be square, circular or of any practical cross-sectional shape; but for applications wherein operating pressures above about 10 pounds per square inch are involved, circular shells are preferable. Supported between the flanges 13 and 14 is the partition 15 which extends entirely across the shell cross-section thereby defining a feed chamber 16 within the upper section of the vessel. A plurality of vertically spaced partitions 17, 18, 19 and 20 are supported across the shell 10, thereby defining a series of separate reaction chambers 21, 22, 23 and 24 and a drain chamber 25. The partitions 17, 18, 19 and 20, as shown, are formed from a number of plates positioned at converging angles so as to provide depressed zones at the bottom of each reaction chamber into which the solid material will flow. Such arrangement prevents or limits the amount of stagnant solid material zones and is, consequently, preferred. Other less preferred forms of partitions, such as flat horizontally positioned plates may be used, however, within the scope of this invention. A conduit 26 is connected into the top of chamber 16 to permit introduction of particle form solid material thereinto against the gaseous pressure therein. The conduit 26 may take the form of a long feed leg of sufficient length to provide a column of solid material therein of sufficient head to permit gravitation of solid material into the chamber 16 against the gaseous pressure therein. On the other hand, a screw conveyor or some other suitable means may be provided for positive introduction of solid material into chamber 16. A plurality of uniformly spaced conduits such as 27, 28 and 29, depend from partition 15 and extend downwardly through the several reaction chambers, terminating with closed ends within the lowermost reaction chamber 24. A cross-section of one of these conduits is shown in Figure 2 from which it may be seen that partitions are provided within the conduits extending vertically throughout the length thereof. These partitions 30 and 31 divide each conduit into four separate vertical passages which is the number of the reaction chambers shown. Orifices, such as 24, are provided along each conduit so positioned as to permit outlet of solid material from one of the passages therein within the upper section of each reaction chamber. Thus one of the vertical passages in each conduit serves as a separate confined solid material flow passage from the feed chamber 16 to a given reaction chamber. A plurality of similar vertical conduits are positioned within the shell 10 so as to extend through the depressed zones at the bottom of each reaction chamber. These conduits, of which two are shown, 32 and 33, are closed on their upper ends and extend through the bottom of the lowermost reaction stage, terminating in the upper section of the drain chamber 25. Similarly, orifices, such as 35, are provided in these conduits so positioned as to provide for flow of solid material from the lower section of each reaction stage into a separate passage within the conduit and thence downward into the drain chamber 25. Whereas only one orifice has been shown in any given inlet or outlet conduit at any given reaction stage, it will be understood that several may be used, provided that they all connect into the proper vertical passage within the conduit provided for that particular stage. It will also be understood that the conduits might be partitioned so as to provide for two passages therein for each reaction stage. On the other hand, more conduits might be used, some serving one group of reaction chambers and others serving other groups of reaction chambers. This latter modification is especially useful when a large number of reaction stages are involved. If the total number of reaction stages involved is low, individual unpartitioned inlet conduits may be provided terminating in the upper section of each reaction chamber. A drain conduit 36 is provided for withdrawal of solid material from the drain chamber 25; and a throttling valve 37 is provided thereon to permit throttling of the solid material flow so as to maintain a substantially compact column of solid material in each of the reaction chambers. Rows of baffles 38 and 39 are provided within the lower section of the drain chamber 25. These baffles have properly distributed orifices there-through which act to split the solid material flow into a plurality of relatively small uniform streams which are gradually and uniformly recombined into the single stream flowing through drain conduit 26. The baffles thereby provide for uniform withdrawal of solid material from the entire cross-section of the drain chamber thereabove, so that the rate of solid material withdrawal from each of the reaction chambers will be uniform. Modified baffling which will accomplish the function of the baffles 38 and 39 may be substituted therefor, or if desired, a plurality of uniformly spaced drain conduits may be provided for uniformly draining the solid material from chamber 25. A row of inverted gas distributor channels, such as 40, is provided in the lower section of each reaction chamber; these channels extend across the chamber in a direction perpendicular to the plane of the drawing. Gas inlet pipes, such as 41, are provided under each channel, and these pipes connect into an external gas inlet manifold, such as 42. The gas inlet manifolds 42, 43, 44 and 45 for reaction chambers 24, 23, 22 and 21, respectively, have flow control valves 46, 47, 48 and 49, respectively, thereon and connect into gas inlet riser conduit 50, which in turn is supplied by main inlet conduit 51. Gas outlet conduits 52, 53, 54 and 55 are connected into the upper sections of reaction chambers 21, 22, 23 and 24, respectively, at locations above the surface of the solid material columns therein. These outlet conduits connect into the outlet riser conduit 56, which in turn connects into the main gas outlet conduit 57. It should be understood that the gas inlet and outlet means shown hereinabove are intended to be exemplary in character and other suitable means for providing reactant gas flow through the solid material are also within the scope of the invention. A conduit 60 having valve 61 thereon is connected into the feed chamber 16 to permit introduction of an inert seal gas thereinto. A row of distributor angles 58 is provided in the drain chamber 25 and inert gas may be admitted under each of these angles through inlet pipes 59 thereunder. In operations wherein the escape of small quantities of the gaseous reactants into the atmosphere is not objectionable, the means for admitting inert gas to the drain chamber 25 and feed chamber 16 may be omitted.

Considering now the operation of the apparatus as applied to the process of catalytically cracking hydrocarbon oils, particle form solid contact mass material at desired temperature conditions is admitted through conduit 26 into the feed chamber 16 against the gaseous pressure therein. The solid material then flows by gravity in parallel to each reaction chamber, passing to each chamber through the corresponding vertical passage provided in each of the conduits 27, 28 and 29, and discharging through the orifices, such as 34, into the upper section of the reaction chambers. The solid material in each reaction chamber passes as a substantially compact column downwardly therethrough, and passes therefrom through orifices, such as 35, in conduits 32 and 33, and through the separate vertical passages provided within said conduits. The spent solid material discharges from the conduits 32 and 33 onto the bed of solid material in the drain chamber 25 and is uniformly drained therefrom through conduit 36 and throttle valve 37. The rate of solid withdrawal is controlled by valve 37 so as to permit maintenance of substantially compact columns of solid material in the reaction chambers. The solid material drained from the reactor may then pass through a suitable regenerator wherein contaminant material deposited during the reaction is removed. The regenerated solid material may then be cycled back to the reactor for another pass therethrough.

Hydrocarbon vapors heated to a suitable conversion temperature in a suitable apparatus (not shown) may pass through main inlet conduit 51 and riser conduit 50 into the several reaction chambers through inlet conduits 46 through 49 inclusive and inlet pipes, such as 41 extending into the vessel under the gas distributing channels 40. The hydrocarbon vapors are distributed across the reaction chambers by means of distributing channels 40 and then pass upwardly through the solid material, finally disengaging therefrom above the surface of the columns thereof in each stage and passing from the stages through outlet conduits 52–55 inclusive. The gaseous conversion products then pass into conduits 56 and then 57 through which they pass to a conventional fractionation and product recovery system (not shown).

If desired, the direction of gas flow through each stage may be reversed by suitable modification of the external manifolding. An inert seal gas is introduced through pipe 60 into feed chamber 16, the rate of introduction being controlled by diaphragm valve 61, controlled by a suitable differential pressure control instrument so as to maintain the pressure in chamber 16 slightly higher, for example ¼–½ pound per square inch, than the maximum gaseous pressure in any of the conversion zones at locations near the outlet orifices 34 in the conduits 27, 28 and 29. In this manner the escape of combustible hydrocarbons into the atmosphere through conduits 27, 28 and 29 and then through conduit 26 is prevented. An inert seal and purge gas, such as steam or flue gas is admitted through pipes 59 under the distributor angles 58 in the drain chamber 25. The inert gas may then pass upwardly through the bed of solid material in the drain chamber thereby purging hydrocarbon vapors from the solid material and then pass upwardly through the conduits 32 and 33 into the several reaction chambers. If desired, part of the purge steam may be withdrawn through conduit 62 to a suitable condenser and separator wherein the purged oil vapors may be recovered. The inert gas pressure within the drain chamber 25 may be controlled slightly above that in the reaction zones by means of diaphragm valve 63 on pipe 62 or by similar valves on inlet pipes 59 operated by a suitable differential pressure control instrument. Thus the escape of combustible reaction vapors through the solid material drain conduit 36 is substantially prevented.

As has been shown in the above described apparatus, the gas flow through the several superimposed reaction chambers is in parallel, the gas passing through a relatively short column of solid material in each reaction chamber. By this provision, considerably higher total gas throughput rates are permissible without unduly disrupting the flow of the solid material, than can be permitted in long single stage reactors. Moreover, it will also be seen that the flow of solid material through the reaction chambers is also in parallel so that solid material of substantially the same catalytic activity and temperature is provided in every chamber. Consequently, the quality and yield of conversion products, such as gasoline, obtained from all the reaction chambers will be substantially the same, thereby entirely overcoming a major disadvantage of multi-stage gas flow operation. Thus when using the apparatus of this invention, no segregation and separate handling of the reaction products from the various reaction stages is required, the products being combined and handled together in a single product recovery system. This improvement has been accomplished without any multiplication of the number of solid material feed and drain zones. Only a single solid material feed chamber, serving also as a seal chamber, is provided above the several reaction chambers; and only a single drain chamber, serving also as a seal and purging chamber, is provided below the several reaction chambers.

In some operations wherein relatively long periods of contact time between the reactant gas and solid material and relatively low gas throughput rates are desirable, the external gas flow conduits may be altered so as to permit series flow of the reactant gas through all or part of the reaction chambers of the apparatus shown in Figure 1. For example by closing valves 71, 72 and 75 in manifold 50, valve 80 in conduit 51 and valves 76–79 in conduits 52–55, and by leaving the remaining valves in the gas inlet and outlet manifolding open, series flow of reactant may be provided through all the reaction chambers. Thus reactant gas enters through conduit 73 and passes through conduit 42 in chamber 24. Gaseous products from chamber 24 pass through conduit 68 to manifold 50 and then through conduit 47 to chamber 23. Gaseous products from chamber 23 pass via conduit 66, manifold 50 and conduit 44 to chamber 22 and products from chamber 22 pass via conduit 65, manifold 50 and conduit 45 to chamber 21. Gaseous products then pass from chamber 21 through conduit 52 to manifold 56 and main outlet conduit 57 to the product recovery system. The apparatus when so used offers distinct advantages over long single stage reactors wherein the solid material and gas flow is straight through. In such a single stage reactor the activity of the solid material catalyst is much lower in the lower section than in the upper section due to contaminant deposition. Moreover, if the reaction involved is the catalytic cracking of hydrocarbons, the catalyst temperature may vary in the different stages of the reactor due to the endothermic nature of the reaction. When the present apparatus is used, the activity and temperature of the solid material catalyst is substantially uniform in all of the reaction stages, so that the gaseous conversion reaction may be conducted at controlled optimum conditions during the entire gaseous conversion.

In some applications it may be desirable to alter the gas inlet manifolding and/or gas outlet manifolding shown in Figure 1 so as to permit passage of reactant vapors having different physical or chemical properties through the several reaction chambers in parallel and then either separately process or combine the reaction products from the several reaction chambers. In other applications it may be desirable to provide heat transfer tubes within all or some of the reaction chambers, through which tubes a heat exchange fluid may be circulated for purpose of supplying or removing heat to or from the solid material in the several reaction chambers.

Any number of reaction chambers may be used depending upon the nature of the reaction involved and the length of each chamber. Generally, longer and fewer chambers may be used with decrease in required gas throughput rates. In general, the maximum linear rate of gas flow in any reaction chamber should be limited below that which would cause serious boiling of the particle form solid material or disruption of its downward flow. The required gas throughput rates, are, of course, inherent for any given reaction and the maximum allowable linear rate of gas flow is dependent upon the type, size and density of the solid material as well as the properties of the reactant gas and the reaction temperature and pressure. In some applications it may be desirable to use several rows of spaced gas distributor and collector channels in each reaction chamber, thereby permitting an increase in the length of said chambers.

All the foregoing illustrations and description of the method and apparatus of this invention and the applications thereof are merely exemplary in character and are in no way intended to limit the scope of this invention.

I claim:

1. An apparatus for contacting gases with particle form solid material comprising: a substantially vertical vessel, partitioning at spaced vertical levels in said vessel dividing it into a vertical series of chambers, the lowermost chamber being a drain chamber and the remaining chambers, numbering at least two, being contact chambers, passage defining members defining separate, isolated passages for introduction of fresh particle form, solid material into the upper section of each contact chamber, a plurality of passage defining members positioned substantially vertically within said vessel and terminating on their lower ends within said drain chamber, said passage defining members defining for each of said contact chambers at least one isolated, substantially vertical passage communicating with the lower section of said contact chamber and terminating within said drain chamber for separate flow of solids from the lower section of said contact chamber into said drain chamber, means to withdraw contact material from said drain chamber, and flow-throttling means associated therewith, means to introduce contacting gas into each contacting chamber and means to withdraw gas from each contacting chamber.

2. A contact apparatus comprising: a substantially vertical vessel closed on either end, a plurality of partitions extending across said shell at spaced vertical intervals so as to define a series of superimposed isolated chambers within said vessel, the lowermost chamber being a drain chamber and the remaining chambers being contact chambers, passage defining members defining separate passages for introduction of particle form solid contact mass material near the upper end of each contact chamber, conduits defining substantially vertical isolated passages for separate flow of said solid material from the lower section of each contact chamber to a common level within the upper section of said drain chamber, means to withdraw said solid material from said drain chamber and flow throttling means associated therewith, baffling within said drain chamber to provide uniform withdrawal of the solid material from the entire cross-section thereof, means to admit contacting gas to each of said contact chambers adjacent one end thereof, means to withdraw contacted gas from each of said contact chambers adjacent the opposite end thereof.

3. An apparatus for conducting gasiform reactions in the presence of a particle form solid contact mass material comprising: a substantially vertical closed vessel, a partition extending across said vessel near the upper end thereof defining a solid material accumulation chamber within the upper end of said vessel, a plurality of vertically spaced partitions across said vessel below said first named partition defining a plurality of separate superimposed chambers, the lowermost of said chambers being a solid material drain chamber and the remaining chambers being reaction chambers, means to admit particle form solid contact mass material to the upper end of said accumulation chamber, a plurality of passage defining members dependent from said first named partition defining separate passages for solid material flow from said accumulating chamber into the upper section of each of said reaction chambers, a plurality of passage defining members defining separate passages for flow of said solid material from the lower section of each of said reaction chambers to a level within the upper section of said drain chamber, conduit means connected to the bottom of said vessel for withdrawal of said solid material from said drain chamber, flow throttling means associated with said withdrawal conduit means, baffle members in the lower section of said drain chamber above said conduit means adapted to provide uniform flow of solid material from all portions of the horizontal cross sectional area of said drain chamber above said baffle members to said withdrawal conduit means, inlet means for flow of reactant gas to each of said reaction chambers, outlet means for flow of gaseous reaction products from each of said reaction chambers, remotely spaced from said inlet means.

4. An apparatus for conducting gasiform reactions in the presence of a particle form solid contact mass material comprising: a substantially vertical closed vessel, a partition extending across said vessel near the upper end thereof defining a solid material accumulation chamber within the upper end of said vessel, a plurality of vertically spaced partitions across said vessel below said first named partition defining a plurality of separate superimposed chambers, the lowermost of said chambers being a solid material drain chamber and the remaining chambers being reaction chambers, means to admit particle form solid contact mass material to the upper end of said accumulation chamber, means to introduce an inert seal gas into said accumulation chamber, a plurality of conduits depending from said first named partition, defining a plurality of separate, isolated passages for solid flow from said accumulation chamber into the upper sections of said reaction chambers, each of said reaction chambers being provided with at least one of said separate passages, a plurality of conduits extending vertically within said vessel defining a plurality of substantially vertical passages for solid flow from said reaction chambers to said drain chamber, at least one separate passage being provided for each reaction chamber and communicating with the lower section thereof, conduit means for withdrawal of solid material from the lower section of said drain chamber, gas inlet means connecting into each reaction chamber, gas outlet means from each reaction chamber and means to introduce an inert gas into the lower section of said drain chamber.

5. A contact apparatus comprising: a substantially vertical closed vessel, means defining a series of superimposed isolated chambers within said vessel, the lowermost chamber being a solid material drain chamber and the remaining chambers being contact chambers, a plurality of substantially vertical conduits extending through all of said contact chambers excepting the lowermost and terminating within said lowermost contact chamber, the lower ends of said conduits being closed, partitioning within each of said conduits defining vertically extending passages therethrough equal in number to the number of contact chambers, said conduits having orifices therein communicating the upper section of each of said contact chambers with a separate one of the passages in said conduits, means to introduce particle form solid material to the upper ends of said conduits, a second plurality of substantially vertical similarly partitioned conduits extending through all of said contact chambers except the uppermost and terminating at their closed upper ends within the uppermost contact chamber and at their open lower ends within said drain chamber, said second named conduits having orifices therein communicating the lower section of each of said contact chambers with a separate one of the partitioned passages within said second named conduits, means to withdraw said solid material from said drain section at a uniform throttled rate from the entire cross-section thereof, means to pass contact gas separately through each of said contact chambers.

6. An apparatus for conducting gasiform reactions in the presence of a particle form solid contact mass material comprising: a substantially vertical closed vessel, a partition extending across said vessel near the upper end thereof defining a solid material accumulation chamber within the upper end of said vessel, a plurality of vertically spaced partitions across said vessel below said first named partition defining a plurality of separate superimposed chambers, the lowermost of said chambers being a solid material drain chamber and the remaining chambers being reaction chambers, means to admit particle form solid contact mass material to the upper end of said accumulation chamber, a plurality of substantially vertical conduits depending from said first named partition and terminating at their closed lower ends within the lowermost reaction chamber, partitioning within each of said conduits defining vertically extending separate passages therethrough equal in number to the number of said reaction chambers, said conduits having outlet orifices therein communicating the upper section of each of said reaction chambers with a separate one of the passages in said conduits, a second plurality of substantially vertical similarly partitioned conduits extending through all of said reaction chambers excepting the uppermost reaction chamber and terminating at their closed upper ends within said uppermost reaction chamber and at their open lower ends within said drain chamber, said second named conduits having orifices therein communicating the lower section of each of said reaction chambers with a separate one of the partitioned passages within each of said second named conduits, means to withdraw said solid material from said drain section at a controlled throttled rate, baffling within said drain section to provide uniform withdrawal of said solid material from the entire cross-section thereof, means to pass reaction gas separately through the solid material within each of said reaction chambers.

7. An apparatus for conducting gasiform reactions in the presence of a particle form solid contact mass material comprising: a substantially vertical closed vessel, a plurality of partitions extending across said vessel at spaced vertical intervals so as to define a series of superimposed chambers within said vessel, the lowermost chamber being a drain chamber and the remaining chambers being reaction chambers, means to introduce particle form solid contact mass material within the upper section of each of said reaction chambers, passage defining members within said vessel defining a plurality of substantially vertical passages for solid flow from said reaction chambers to said drain chamber, all of said passages being isolated from each other and terminating on their open lower ends in the upper section of said drain chamber, the lower section of each of said reaction chambers communicating with at least one separate one of said passages, outlet means for flow of said solid material from said drain chamber, flow throttling means associated with said outlet, baffling within said drain chamber to provide uniform withdrawal of the solid material from the entire cross-section thereof, reactant gas inlet means to each of said reaction chambers and gas outlet means therefrom, said outlet means being so spaced from said inlet means in each reaction chamber as to provide for gas flow through the substantially compact column of solid material maintained in each reaction chamber, members defining passages for series gas flow between at least some of said reaction chambers.

8. An apparatus for contacting gases with particle form solid material comprising: a substantially vertical vessel, partitioning at spaced vertical levels in said vessel dividing it into a vertical series of chambers, the lowermost chamber being a drain chamber and the remaining chambers, numbering at least two, being contact chambers, means to introduce fresh particle form, solid material separately into the upper section of each contact chamber, a plurality of passage defining members positioned substantially vertically within said vessel and terminating on their lower ends within said drain chamber, said passage defining members defining for each of said contact chambers at least one isolated, substantially vertical passage communicating with the lower section of said contact chamber and terminating within said drain chamber for separate flow of solids from the lower section of said contact chamber into said drain chamber, means to withdraw contact material from said drain chamber, and flow-throttling means associated therewith, means to introduce contacting gas into each contacting chamber and means to withdraw gas from each contacting chamber, and means for introducing an inert purge gas into said drain chamber substantially below the terminations of said passage defining members therein.

9. A method for conducting reactions involving gasiform reactants in the presence of a particle form solid contact mass material comprising: supplying particle form solid material onto an accumulation thereof in a confined feed zone; maintaining a vertical series of superposed, isolated reaction beds of contact material below said feed zone; flowing contact material in a separate substantially compact, confined stream of gravitating particles from said feed zone onto each of said beds, said stream being of substantially smaller cross section than said beds; introducing a separate stream of fluid reactant into each of said beds and causing it to flow uniformly through the bed to effect the desired reaction at controlled reaction temperature conditions; withdrawing gasiform reaction products separately from each bed; maintaining a confined accumulation of said solid material in a drain zone below the lowermost bed, flowing used solid material from the lower portion of each bed as a separate, confined, compact, uninterrupted stream downwardly onto the surface of said accumulation in said drain zone, said stream being of small cross section as compared with the cross section of said bed; withdrawing a stream of solid material from the bottom of said drain zone at a controlled, throttled rate so as to maintain continuity of substantially compact solid material stream extending upwardly through said accumulation said drain zone, through any given one of said confined streams discharging thereonto, through the corresponding reaction zone from which said stream flows and through the confined stream supplying said bed to said feed zone; baffling the flow in the lower portion of said accumulation above the withdrawal stream to effect uniformity of solid material flow from all across said accumulation to said withdrawal stream; and maintaining an inert gas pressure in said feed and drain zones above the gaseous pressure in said reaction beds.

10. A method for conducting gaseous reactions in the presence of a particle form solid material comprising the steps; supplying particle form solid material at controlled temperature to an accumulation thereof maintained in a confined feed zone, separately conducting solid material from said feed zone to each of a series of superposed isolated confined reaction zones as a plurality of separate, confined, continuous, compact streams of gravitating solid material, located below said feed zone, separately conducting solid material from each of said reaction zones as a plurality of confined, continuous compact gravitating streams discharging directly onto the surface of a confined accumulation of solid material maintained in a single drain zone located below said reaction zones so as to maintain continuity of substantially compact columnar flow from said reaction zones to said accumulation in said drain zone, uniformly withdrawing said solid material from said drain zone at a controlled rate, passing reactant gas at controlled conditions of temperature and pressure through each reaction zone in contact with the particle form solid material passing therethrough and effecting serial flow of said reactant gases through at least some of said reaction zones, maintaining an inert gaseous pressure in said feed zone at least slightly above the pressure in said reaction zones, passing an inert gas through the solid material in said drain zone to purge reaction gases therefrom and maintaining the pressure of said inert gas in said drain zone at least slightly above the pressure in said reaction zones.

11. A method for conducting gas-solid contact operations comprising: continuously directing the flow of particle form solid material from a continuously replenished accumulation thereof in parallel to a series of superimposed confined, isolated contacting zones, continuously conducting said solid material from the lower ends of said contacting zones as substantially compact, confined gravitating streams which discharge directly onto the surface of a single confined accumulation of solid material therebelow so as to maintain continuity of compact solid stream flow between said contacting zones and said accumulation, uniformly withdrawing said solid material uniformly from substantially all portions of the horizontal cross sectional area of said last named accumulation at a controlled rate so as to control uniform flow of solid material as a substantially compact mass through said contacting zones, and passing contacting gas serially through the solid material in said contacting zones.

12. An apparatus for conducting gasiform reactions in the presence of a particle form solid contact mass material comprising: a substantially vertical closed vessel, a plurality of partitions extending across said vessel at spaced vertical intervals so as to define a series of superimposed chambers within said vessel, the lowermost chamber being a drain chamber and the remaining chambers being reaction chambers, means to introduce particle form solid contact mass material within the upper section of each of said reaction chambers, a plurality of substantially vertical conduits positioned within said vessel and terminating on their lower ends at a level within the upper section of said drain chamber, all of said conduits extending upwardly through at least some of said reaction chambers and being closed on their upper ends, vertical partitioning within each of said conduits dividing it into a plurality of isolated vertically extending passages for solid flow, orifices in said conduits communicating the lower section of each of said reaction chambers with a separate one of the passages in said conduits, outlet means for flow of said solid material from said drain chamber, flow throttling means associated with said outlet, baffling within said drain chamber to provide uniform withdrawal of the solid material from the entire cross section thereof, reactant gas inlet means to each of said reaction chambers and gas outlet means therefrom, said outlet means being so spaced from said inlet means in each reaction chamber as to provide for gas flow through the substantially compact column of solid material maintained in each reaction chamber.

LOUIS P. EVANS.

REFERENCES CITED

The following references are of record in the file of this patent:

UNITED STATES PATENTS

| Number | Name | Date |
|---|---|---|
| 2,020,115 | Gray | Nov. 5, 1935 |
| 2,183,301 | Bossner et al. | Dec. 12, 1939 |
| 2,201,688 | Zuhlke | May 21, 1940 |
| 2,257,178 | Martin et al. | Sept. 30, 1941 |
| 2,400,176 | Thiele | May 14, 1946 |
| 2,408,600 | Berg | Oct. 1, 1946 |
| 2,410,309 | Simpson et al. | Oct. 29, 1946 |
| 2,425,969 | Utterback | Aug. 19, 1947 |

FOREIGN PATENTS

| Number | Country | Date |
|---|---|---|
| 731,143 | France | May 24, 1932 |
| 457,430 | Germany | Mar. 16, 1928 |
| 497,239 | Germany | May 3, 1930 |